United States Patent
Nishitani

(10) Patent No.: US 9,703,067 B2
(45) Date of Patent: Jul. 11, 2017

(54) LENS BARREL AND IMAGE CAPTURING APPARATUS

(71) Applicant: CANON KABUSHIKI KAISHA, Tokyo (JP)

(72) Inventor: Hitoshi Nishitani, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/622,410

(22) Filed: Feb. 13, 2015

(65) Prior Publication Data

US 2015/0234146 A1    Aug. 20, 2015

(30) Foreign Application Priority Data

Feb. 18, 2014  (JP) .................................. 2014-028086

(51) Int. Cl.
*G02B 7/02* (2006.01)
*G02B 15/14* (2006.01)
(Continued)

(52) U.S. Cl.
CPC ............... *G02B 7/023* (2013.01); *G02B 7/08* (2013.01); *G02B 7/102* (2013.01); *G03B 5/02* (2013.01);
(Continued)

(58) Field of Classification Search
CPC .......... G02B 7/10; G02B 7/102; G02B 7/021; G02C 7/08; H04N 5/23296; G11B 7/0932; G11B 7/0935
(Continued)

(56) References Cited

U.S. PATENT DOCUMENTS 6,169,578 B1    1/2001  Chigira
2002/0039241 A1  4/2002  Nomura et al.
(Continued)

FOREIGN PATENT DOCUMENTS

CN    101676760 A    3/2010
JP    2010-266582 A    11/2010

OTHER PUBLICATIONS

British Combined Search and Examination Report issued on Aug. 11, 2015, that issued in the corresponding U.K Patent Application No. 1502713.9.
(Continued)

*Primary Examiner* — Dawayne A Pinkney
(74) *Attorney, Agent, or Firm* — Cowan, Liebowitz & Latman, P.C.

(57) ABSTRACT

A lens barrel includes a base barrel holding a first guide portion, a movable barrel protrudable/retractable with respect to the base barrel and holding a second guide portion such that when the movable barrel is protruded the second guide portion protrudes with respect to the first guide portion a lens holding member including first and second held portions being respectively held by the first and second guide portions, a lock portion to set a positional relationship between the first and second guide portions, an initial position detector to detect an initial position of the lens holding member, and a controller. The controller controls movements of the movable barrel and the lens holding member so that a movement of the lens holding member toward the initial position detector is started before start of setting of the positional relationship by the lock portion.

13 Claims, 14 Drawing Sheets

(51) Int. Cl.
  *G03B 17/00*  (2006.01)
  *H04N 5/262*  (2006.01)
  *G03B 5/02*   (2006.01)
  *G03B 17/04*  (2006.01)
  *G03B 17/12*  (2006.01)
  *G02B 7/08*   (2006.01)
  *G02B 7/10*   (2006.01)

(52) U.S. Cl.
  CPC ............ *G03B 17/04* (2013.01); *G03B 17/12* (2013.01); *G03B 2205/0092* (2013.01)

(58) Field of Classification Search
  USPC ..... 359/811–830, 699–701, 694; 396/76, 79; 348/240.99–240.3
  See application file for complete search history.

(56) References Cited

U.S. PATENT DOCUMENTS

| | | | |
|---|---|---|---|
| 2007/0195430 A1* | 8/2007 | Koyama | G03B 5/00 359/703 |
| 2010/0046085 A1* | 2/2010 | Yumiki | G02B 7/102 359/684 |
| 2013/0033760 A1* | 2/2013 | Nomura | G02B 7/102 359/696 |
| 2014/0168793 A1 | 6/2014 | Fukino | |

OTHER PUBLICATIONS

Nov. 23, 2016 Chinese Office Action, with an English Translation, that issued in Chinese Patent Application No. 201510085087.1.

\* cited by examiner

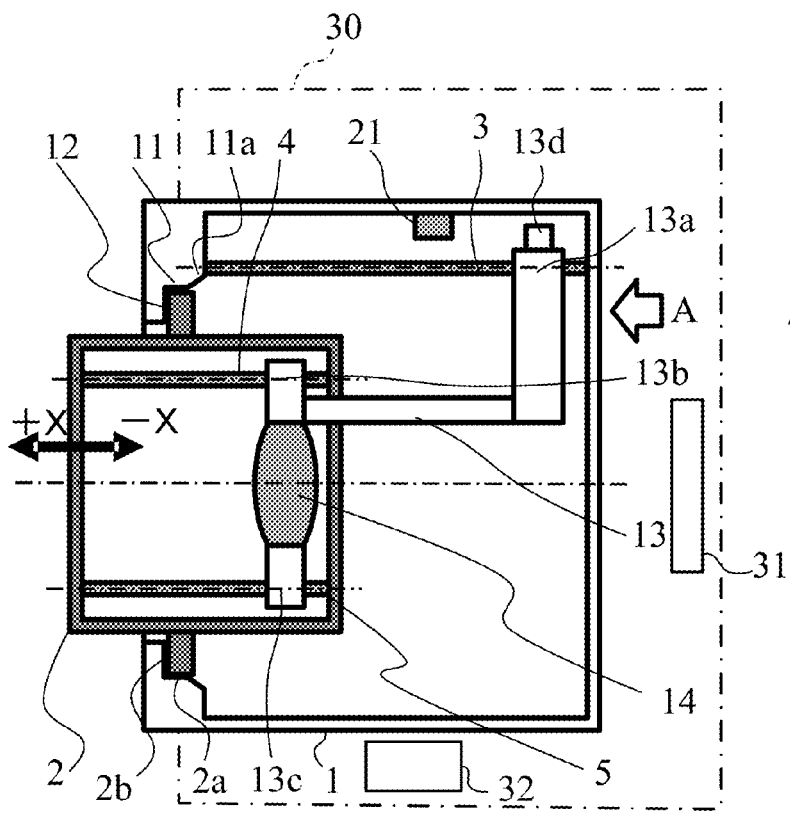
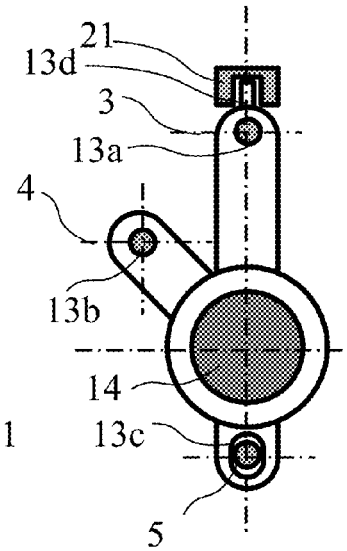
FIG. 1A
FIG. 1B
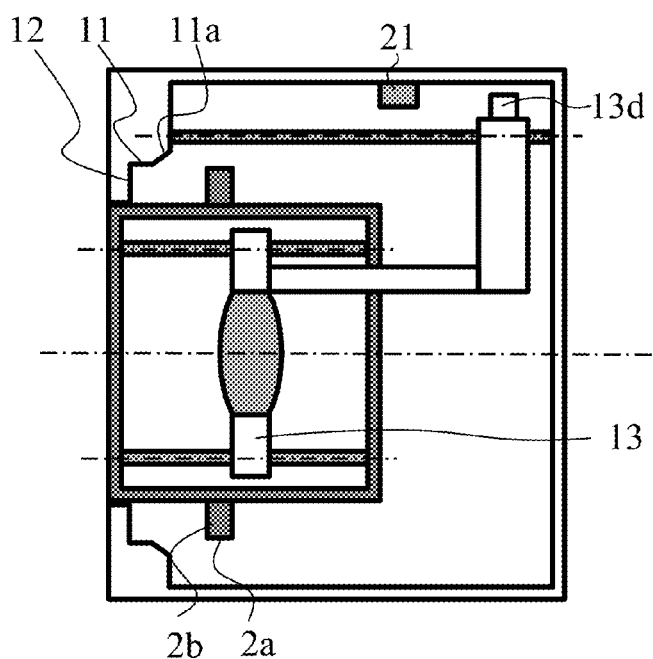
FIG. 1C

LENS BARREL AND IMAGE CAPTURING APPARATUS

BACKGROUND OF THE INVENTION

Field of the Invention

The present invention relates to a retractable lens apparatus to be used for image capturing apparatuses such as digital cameras and video cameras.

Description of the Related Art

Compact image capturing apparatuses are often provided with a retractable lens barrel (lens apparatus) whose barrel length becomes long by an object-side protrusion of a movable barrel with respect to a base barrel in an image capturing state, and becomes short by retraction of the movable barrel with respect to the base barrel in a non-image capturing state. In order to ensure a relative positional accuracy between the base barrel and the movable barrel for satisfying a required optical performance in the image capturing state, the retractable lens barrel needs to have a reduced relative eccentricity and a reduced relative tilt between the base barrel and the movable barrel.

Japanese patent Laid-Open No. 2010-266582 discloses a lens barrel in which a lens holding member (lens holder) holding a lens is biased with a spring so that a relative eccentricity and a relative tilt between multiple lenses are reduced. Specifically, the lens holder guided by a guide shaft is biased with the spring so as to be in contact with the guide shaft with pressure, and thereby an eccentricity of the lens holder in a plane orthogonal to an optical axis and a tilt of the lens holder with respect to the optical axis are reduced.

On other hand, image capturing apparatuses that can perform moving image capturing need to move a lens quietly for preventing noise from being recorded and to move the lens smoothly for preventing image shaking during the moving image capturing. Therefore, these image capturing apparatuses often employ a lens driving mechanism to move a lens holder by using a lead screw or the like with guide of the lens holder by a guide shaft. Such a configuration needs to detect the position of the lens holder in order to perform position control thereof and thus generally includes a position detector, such as a photo interrupter, to detect a reference position that is a position detection reference of the lens holder at one place in a movable range of the lens holder. Specifically, a detection operation of the reference position is performed by moving the lens holder near the position detector after power-on of the image capturing apparatus and before start of the image capturing.

However, there is the following problem in an image capturing apparatus provided with the above-mentioned retractable lens barrel and performing the eccentricity and tilt adjustments of the movable barrel or the lens holder, and an operation to detect the reference position of the lens holder. Such an image capturing apparatus enters into a standby state of allowing image capturing (image capturing standby state) after the power-on thereof. After power-on the lens barrel protrudes from its retracted state and then the eccentricity and tilt adjustments and the reference position detection operation are completed, before the image capturing standby state is entered. This sequence causes a problem that a standby wait time which is a period of time required from the power-on to the image capturing standby state becomes long.

SUMMARY OF THE INVENTION

The present invention provides a retractable lens barrel capable of shortening a standby wait time during which eccentricity and tilt adjustments of a movable barrel and a reference position detection operation of a lens holding member are performed. The present invention further provides an image capturing apparatus with the above lens barrel.

The present invention provides as an aspect thereof a lens barrel including a base barrel, a first guide portion held by the base barrel, a movable barrel protrudable and retractable with respect to the base barrel in an optical axis direction, a second guide portion held by the movable barrel such that when the movable barrel is protruded with respect to the base barrel, the second guide portion protrudes in the optical axis direction with respect to the first guide portion, a lens holding member including a first held portion and a second held portion, the first and second held portions being respectively held by the first guide portion and the second guide portion, a lock portion to set a positional relationship between the first and second guide portions, an initial position detector configured to detect an initial position of the lens holding member in the optical axis direction, and a controller configured to control movements of the movable barrel and the lens holding member so that a movement of the lens holding member toward the initial position detector is started before start of setting of the positional relationship by the lock portion.

The present invention provides as another aspect thereof a lens barrel including a base barrel, a first guide portion held by the base barrel, a movable barrel protrudable and retractable with respect to the base barrel in an optical axis direction, a second guide portion held by the movable barrel such that when the movable barrel is protruded with respect to the base barrel, the second guide portion protrudes in the optical axis direction with respect to the first guide portion, a lens holding member including a first held portion and a second held portion, the first and second held portions being respectively held by the first guide portion and the second guide portion, a lock portion to set a positional relationship between the first and second guide portions, an initial position detector configured to detect an initial position of the lens holding member in the optical axis direction, and a controller configured to control movements of the movable barrel and the lens holding member so that detection of the initial position by the initial position detector is performed after completion of protrusion of the second guide portion and before completion of setting of the positional relationship by the lock portion.

The present invention provides as still another aspect thereof an image capturing apparatus including a body of the apparatus, and one of the above lens barrels, and an image sensor.

Further features of the present invention will become apparent from the following description of embodiments with reference to the attached drawings. Each of the embodiments of the present invention described below can be implemented solely or as a combination of a plurality of the embodiments or features thereof where necessary or where the combination of elements or features from individual embodiments in a single embodiment is beneficial.

BRIEF DESCRIPTION OF THE DRAWINGS

FIGS. 1A to 1C show a configuration of a lens barrel according to Embodiment 1 of the present invention.

DESCRIPTION OF THE EMBODIMENTS

Figures 2A, 2B:
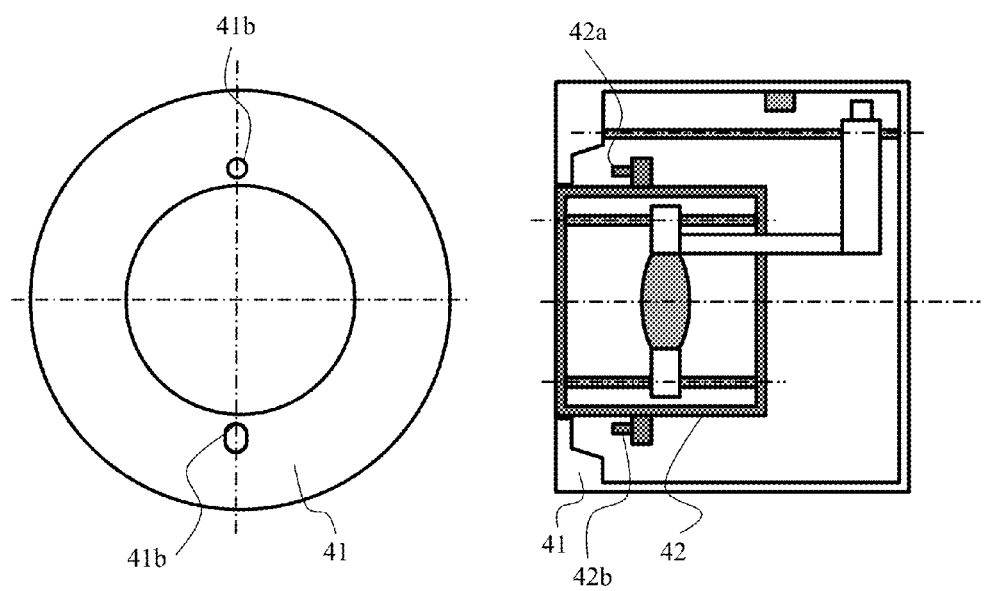
FIGS. 2A and 2B show a configuration of a modified example of the lens barrel of Embodiment 1.

Embodiments of the present invention will hereinafter be described with reference to the accompanying drawings.

Embodiment 1

Description will be made of a configuration of a lens barrel (lens apparatus) according to a first embodiment (Embodiment 1) of the present invention with reference to FIGS. 1A to 1C. FIG. 1A shows the configuration of the lens barrel in a protruded state (or an image capturable state; hereinafter referred to as "an image capturing standby state"). FIG. 1C shows the configuration of the lens barrel in a retracted state (or a non-image capturable state). FIG. 1B shows the configuration of the lens barrel when viewed from a direction indicated by an arrow A in FIG. 1A.

Reference numeral 1 denotes a fixed barrel as a base barrel, and reference numeral 2 denotes a movable barrel that is movable with respect to the fixed barrel 1 in a direction in which an optical axis extends (directions indicated as +X and −X in the figure). The direction in which the optical axis extends is hereinafter referred to as "an optical axis direction". The fixed barrel 1 and the movable barrel constitute a barrel part of the lens barrel. The fixed barrel 1 as a base member of the lens barrel is fixed to a main body of an image capturing apparatus 30 capable of moving image capturing, such as a digital camera and a video camera. The main body of the image capturing apparatus 30 includes thereinside an image sensor 31, such as a CCD sensor or a CMOS sensor, to capture (that is, photoelectrically convert) an object image formed by an image capturing optical system housed in the lens barrel (barrel part).

The movable barrel 2 is movable between a retracted position at which it is retracted with respect to the fixed barrel 1 as shown in FIG. 1C and a protruded position at which it is protruded with respect to the fixed barrel 1 as shown in FIG. 1A. The +X direction shown in FIG. 1A is a protrusion direction in which the movable barrel 2 is protruded with respect to the fixed barrel 1, and the −X direction is a retraction direction in which the movable barrel 2 is retracted with respect to the fixed barrel 1. The movable barrel 2 is moved to the optical axis direction by a movable barrel driving mechanism (not shown) constituted by, for example, a motor and a cam barrel that is rotated by the motor around an outer circumference of the movable barrel 2 (that is, inside an inner circumference of the fixed barrel 1). In the following description, a direction orthogonal to the optical axis direction and a plane orthogonal to the optical axis direction are respectively also referred to as "an eccentricity direction" and "an eccentricity plane".

Reference numeral 3 denotes a first guide shaft as a first guide portion supported (held) by the fixed barrel 1, and reference numeral 4 denotes a second guide shaft as a second guide portion supported (held) by the movable barrel 2. Reference numeral 5 denotes a third guide shaft as a third guide portion supported (held) by the movable barrel 2. Although third guide shaft 5 is supported by the movable barrel 2 in this embodiment, it may be supported by the fixed barrel 1. The second guide shaft 4 is supported (held) by the movable barrel 2 such that when the movable barrel is at the protruded position at which it is protruded with respect to the fixed barrel 1, the second guide shaft 4 protrudes in the optical axis direction with respect to the first guide shaft 3. In other words the second guide shaft 4 follows the movement of the movable barrel 2. In this embodiment the third guide shaft 5 follows the movement of the movable barrel 2 similarly to the second guide shaft 4.

Reference numeral 11 denotes an inner cylindrical surface provided in the fixed barrel 1 in order to adjust a relative position of the second guide shaft 4 with respect to the first guide shaft 3 in the eccentricity plane. The movable barrel 2 has an outer cylindrical surface (lock portion) 2a circumferentially fitting the inner cylindrical surface 11 and thereby enabling adjustment of a position of the movable barrel with respect to the fixed barrel 1 in the eccentricity plane (in other words, reduction of an eccentricity amount of the movable barrel 2 with respect to the fixe barrel 1). Thus, the relative position (translational eccentricity) of the second guide shaft 4 to the first guide shaft 3 in the eccentricity plane is set with high accuracy.

The fixed barrel 1 further has a slope portion 11a at a position adjacent in the −X direction to the inner cylindrical surface 11. The slope portion 11a smoothly guides the outer cylindrical surface 2a of the movable barrel 2 to a position where the outer cylindrical surface 2a circumferentially fits the inner cylindrical surface 11. The inner cylindrical surface 11 and the slope portion 11a constitute a translational eccentricity adjustment portion. The movable barrel 2 moved to a translational eccentricity reduction position with respect to the fixed barrel 1 in the optical axis direction receives a translational eccentricity reduction effect from the translational eccentricity adjustment portion, and thereby the translational eccentricity of the movable barrel 2 with respect to the fixed barrel 1 is reduced.

The translational eccentricity adjustment portion may have other configurations. For example, as shown in FIGS. 2A and 2B, a configuration may be employed in which two projections 42a and 42b provided in a movable barrel 42 and extending in the optical axis direction are inserted into a round hole 41a and an elongated hole 41b formed in a fixed barrel 41.

In FIGS. 1A to 1C, reference numeral 12 denotes a circular ring surface provided in the fixed barrel 1. The circular ring surface 12 enables adjustment (reduction) of a tilt of the movable barrel 2 with respect to the optical axis and thereby enables adjustment of a tilt eccentricity of the second guide shaft 4 supported by the movable barrel 2 with respect to the first guide shaft 3 supported by the fixed barrel 1. The circular ring surface 12 makes contact with a circular ring surface (lock portion) 2b provided at a front end of the movable barrel 2, and thereby the tilt eccentricity is adjusted (reduced). Thus, a parallelism of the second guide shaft 4 with respect to the first guide shaft 3 is set with high accuracy. The circular ring surface 12 constitutes a tilt eccentricity adjustment portion. The movable barrel 2 moved to a tilt eccentricity reduction position with respect to the fixed barrel 1 in the optical axis direction receives a tilt eccentricity reduction effect from the tilt eccentricity adjustment portion, and thereby the tilt eccentricity of the movable barrel 2 with respect to the optical axis is reduced. In the following description, the translational eccentricity and the tilt eccentricity are respectively referred to simply as "an eccentricity" and "a tilt".

Reference numeral 13 denotes a lens frame as a lens holding member that is movable in the optical axis direction. The lens frame 13 is provided with guided portions (held portions) 13a, 13b and 13c which are respectively guided (held) by the first, second and third guide shafts 3, 4 and 5 in the optical axis direction. The guided portions 13a and 13b are formed as round hole portions with which the first and second guide shafts 3 and 4 engage, and the guided portion 13c is formed as an elongated hole portion with which the third guide shaft 5 engages. Reference numeral 14 denotes a lens that is held by the lens frame 13. The lens 14 constitutes, together with other lenses and an aperture stop (not shown), the image capturing optical system. The lens frame 13 is moved in the optical axis direction for zooming or focusing.

Reference numeral 21 denotes a photo interrupter (initial position detector) that can detect at least one position of the lens frame 13 within its movable range in the optical axis direction. In this embodiment, a configuration is employed in which a detected portion 13d provided in the lens frame 13 enters between a light emitter and a light receiver provided inside the photo interrupter 21 to interrupt entrance of light from the light emitter to the light receiver at an initial position in the optical axis direction. The initial position is a reference position of the lens frame 13 in its position control. Interrupting the entrance of the light from the light emitter to the light receiver by the detected portion 13d switches an output signal from the light receiver that has received the light before the interruption, from "High" to "Low". Thus, moving the lens frame 13 so that the detected portion 13d enters from outside to inside of the photo interrupter 21 makes it possible to detect that the lens frame 13 moves to (reaches) the initial position. In response to detection of reaching of the lens frame 13 to the initial position (hereinafter referred to as "initial position detection of the lens frame 13), position information of the lens frame 13 in its positional control can be reset. Such an operation to move the lens frame 13 and then reset the position information in the positional control in response to the initial position detection of the lens frame 13 is hereinafter referred to as "a reset operation".

Although this embodiment uses, as the initial position detector for the lens frame 13, the photo interrupter 21 that is a non-contact detector, other initial position detectors, such as a contact magnetic sensor and a mechanical contact switch may be used. Moreover, although this embodiment places the photo interrupter 21 at approximately the center of the movable range of the lens frame 13, the photo interrupter 21 may be placed at any position as long as it is within the movable range of the lens frame 13.

As described above, the lens barrel of this embodiment employs the configuration in which, in order to move the lens frame 13 in the optical axis direction quietly and smoothly in the moving image capturing, the first, second and third guide shafts 5 guide the lens frame 13. The lens frame 13 is moved in the optical axis direction by a lens driving mechanism (not shown) constituted by, for example, a combination of a lead screw and a rack, or a voice coil motor as a linear actuator.

In addition, the first guide shaft 3 and the second guide shaft 4 are respectively supported by the fixed barrel 1 and the movable barrel 2 in this embodiment, which enables miniaturization of the lens barrel in the retracted state shown in FIG. 1C.

Figure 3A:
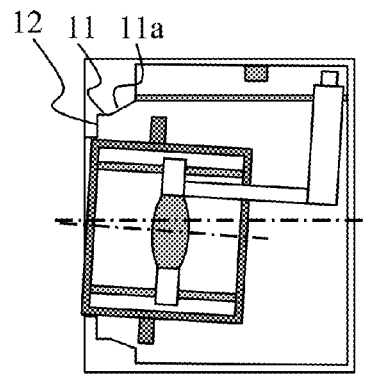
FIGS. 3A to 3D show eccentricity and tilt adjustment operations of the lens barrel of Embodiment 1.

Next, a detailed description will be made of eccentricity and tilt adjustment operations of the movable barrel 2 with respect to the fixed barrel 1 in the lens barrel of this embodiment with reference to FIGS. 3A to 3D. FIG. 3A shows a state where the movable barrel 2 has an eccentricity and a tilt with respect to the fixed barrel 1 in the retracted state. FIG. 3B shows a state where the movable barrel 2 is moved in the +X direction (protrusion direction) from the state shown in FIG. 3A, the outer cylindrical surface 2a of the movable barrel 2 reaches the slope portion 11a of the fixed barrel 1 and thereby the eccentricity adjustment operation is started.

Figure 3C:
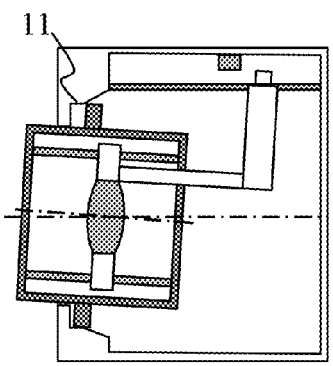
Figure 3B:
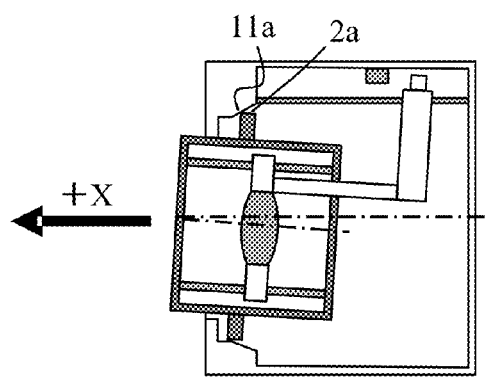

FIG. 3C shows a state where the movable barrel 2 is further moved in the +X direction from the state shown in FIG. 3B and the outer cylindrical surface 2a of the movable barrel 2 fits within the inner cylindrical surface 11 of the fixed barrel 1, that is, where the movable barrel 2 has received the eccentricity reduction effect. This state is hereinafter referred to as "an eccentricity adjustment completed state". In the eccentricity adjustment completed state, although the eccentricity of the movable barrel 2 with respect to the fixed barrel 1 has been adjusted (reduced), the tilt of the movable barrel 2 with respect to the fixed barrel 1 remains.

Figure 3D:
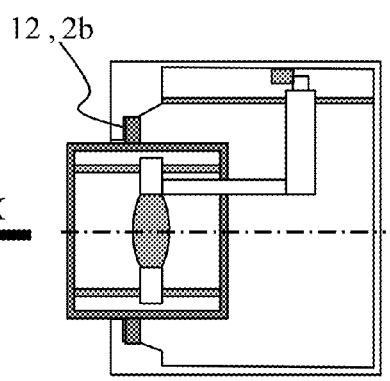

FIG. 3D shows a state where the movable barrel 2 is further moved in the +X direction from the state shown in FIG. 3C and the circular ring surface 2b of the movable barrel 2 is in contact with the circular ring surface 12 of the fixed barrel 1, that is, where the movable barrel 2 has received the tilt reduction effect. In this state, in addition to the eccentricity of the movable barrel 2 with respect to the fixed barrel 1, the tilt thereof has been adjusted (reduced).

As described above, the movable barrel 2 is adjusted in its eccentricity with respect to the fixed barrel 1 by being moved in the +X direction to the position shown in FIG. 3C and then is adjusted in its tilt with respect to the fixed barrel 1 by being further moved in the +X direction to the position shown in FIG. 3D. In the following description, the state shown in FIG. 3D is referred to as "an eccentricity/tilt adjustment completed state".

Next, description will be made of operations of the lens barrel of this embodiment during transition from the retracted state to the image capturing standby state with reference to FIGS. 4A to 4E. In FIGS. 4A to 4E, the eccentricity and tilt of the movable barrel 2 with respect to the fixed barrel 1 shown in FIGS. 3A to 3D are omitted (i.e. not shown).

Figure 4A:
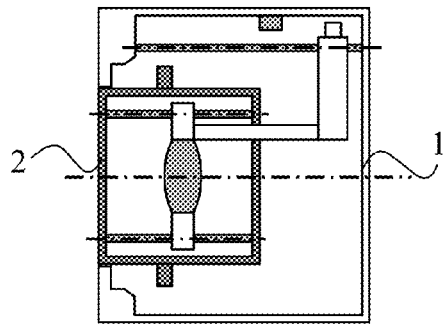
FIGS. 4A to 4E show protrusion and retraction operations of the lens barrel of Embodiment 1.

FIG. 4A shows the retracted state corresponding to FIG. 3A in which almost the whole of the movable barrel 2 is housed in the fixed barrel 1. FIG. 4B shows a state immediately after the movable barrel 2 starts its movement in the +X direction from the retracted state. FIG. 4C shows a state after the lens frame 13 starts its movement in the +X direction from the state shown in FIG. 4B and the detected portion 13d of the lens frame 13 proceeds toward the photo interrupter 21 (that is, toward the initial position).

Figure 4D:
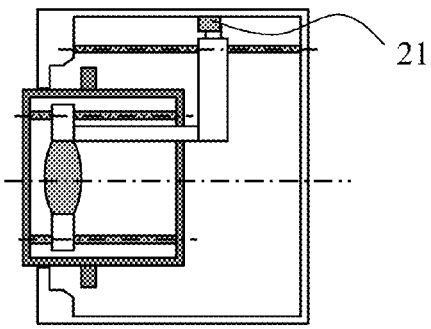
Figure 4B:
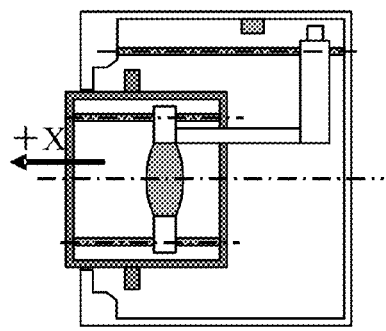

FIG. 4D shows a reset operation completed state where the detected portion 13d of the lens frame 13 has entered inside the photo interrupter 21 (that is, the lens frame 13 has reached the initial position) and thereby the initial position detection of the lens frame 13 has completed.

Figure 4E:
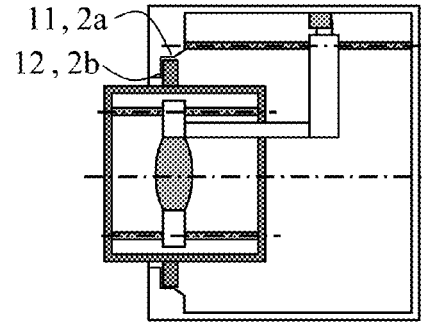
Figure 4C:
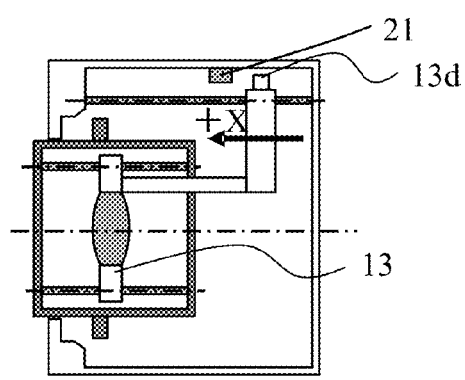

FIG. 4E shows the eccentricity/tilt adjustment completed state where the movable barrel 2 has been moved with respect to the fixed barrel 1 to the position where the eccentricity and tilt adjustment operations have completed. This state corresponds to the image capturing standby state. The reaching of the movable barrel 2 to this position can be detected by a detector (not shown). The movable barrel 2 and the lens frame 13 are respectively controlled in their movement speeds so as to reach their positions shown in FIG. 4E from their positions shown in FIG. 4D.

As described above, in the lens barrel of this embodiment, the eccentricity and tilt adjustment operations of the movable barrel 2 with respect to the fixed barrel 1 and the reset operation of the lens frame 13 are performed from the retracted state, and the completion of them completes the transition to the image capturing standby state. The reset operation of the lens frame 13 is completed before the completion of the eccentricity and tilt adjustment operations of the movable barrel 2.

Figure 5:
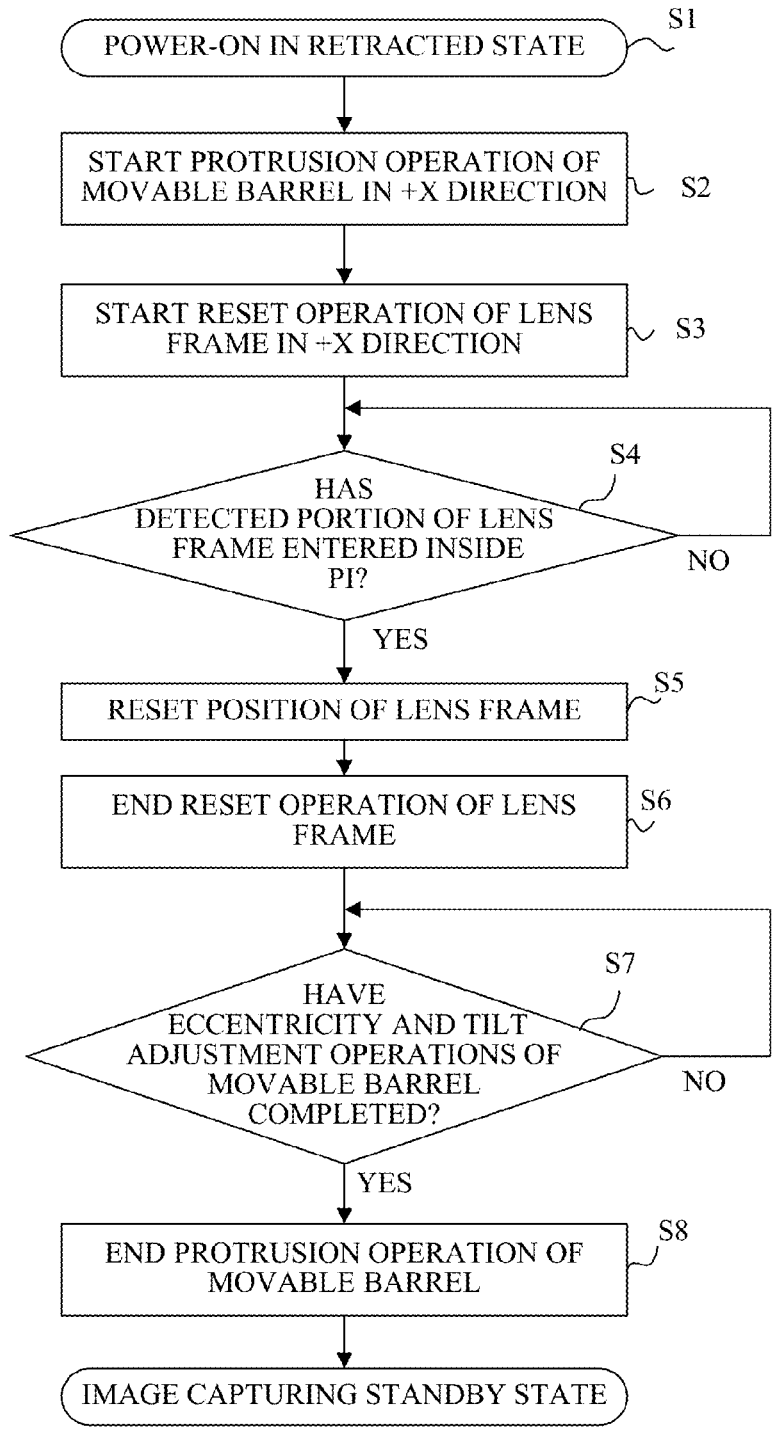
FIG. 5 is a flowchart showing control of the lens barrel of Embodiment 1.

FIG. 5 is a flowchart showing the operations of the lens barrel during the transition from the retracted state to the image capturing standby state. As shown in FIGS. 1A to 1C, the main body 30 of the image capturing apparatus includes thereinside a controller 32 as a computer that controls the operations of the lens barrel (of the movable barrel driving mechanism and the lens driving mechanism). The controller 32 controls the operations of the movable barrel driving mechanism and the lens driving mechanism according to a control program as a computer program.

In response to power-on of the image capturing apparatus at step S1, the controller 32 drives at step S2 the movable barrel driving mechanism to start the movement of the movable barrel 2 in the protrusion direction from the retracted state, as shown in FIG. 4B. Thereafter, the controller 32 drives at step S3 the lens driving mechanism to start the movement of the lens frame 13 in the +X direction (hereinafter referred to as "in a reset direction"), that is, the reset operation, as shown in FIG. 4C.

Next, at step S4, the controller 32 determines whether or not the detected portion 13d of the lens frame 13 has entered inside the photo interrupter (abbreviated as "PI" in the FIG. 21, that is, whether or not the output signal from the light receiver of the photo interrupter 21 has changed from "High" to "Low". If the detected portion 13d has not yet entered inside the photo interrupter 21 as shown in FIG. 4C, the controller 32 continues the movement of the lens frame 13 in the reset direction through the lens driving mechanism. On the other hand, if the detected portion 13d has entered inside the photo interrupter 21 as shown in FIG. 4D, the controller 32 resets at step S5 the position information of the lens frame 13 stored thereinside. Then, at step S6, the controller 32 stops the drive of the lens driving mechanism to end the movement of the lens frame 13 in the reset direction (that is, end the reset operation), as shown in FIG. 4E.

Next, at step S7, the controller 32 determines whether or not the eccentricity and tilt adjustment operations of the movable barrel 2 have completed. If the eccentricity and tilt adjustment operations have not yet completed, the controller 32 continues the movement of the movable barrel 2 in the protrusion direction through the movable barrel driving mechanism. On the other hand, if the eccentricity and tilt adjustment operations have completed, the controller 32 stops at step S8 the drive of the movable barrel driving mechanism to stop the movement of the movable barrel 2 in the protrusion direction, as shown in FIG. 4E. Thus, the transition to the image capturing standby state is completed.

As described above, the lens barrel of this embodiment starts the reset operation of the lens frame as shown in FIG. 4C before the completion of the eccentricity and tilt adjustment operations of the movable barrel 2 which is shown in FIG. 4E. Moreover, the lens barrel of this embodiment performs the initial position detection of the lens frame 13 by the reset operation as shown in FIG. 4D before the completion of the eccentricity and tilt adjustment operations of the movable barrel 2. Therefore, as compared with a case of starting the reset operation of the lens frame 13 after the completion of the eccentricity and tilt adjustment operations, it is possible to shorten a standby waiting time required for the transition from the retracted state to the image capturing standby state. As a result, image capturing can be started in a shorter time after the power-on of the image capturing apparatus.

Since the reset operation of the lens frame is completed before the completion of the eccentricity and tilt adjustment operations of the movable barrel 2, it is desirable that amounts of the eccentricity and tilt of the movable barrel 2 before the completion of the eccentricity and tilt adjustment operations be as small as possible so that the eccentricity and tilt do not influence accuracy of the initial position detection of the lens frame 13.

Embodiment 2

Description will be made of operations of a lens barrel according to a second embodiment (Embodiment 2) of the present invention during transition from a retracted state to an image capturing standby state with reference to FIGS. 6A to 6E. The lens barrel of this embodiment has a same configuration as that of the lens barrel of Embodiment 1, so that components of the lens barrel of this embodiment identical to those in Embodiment 1 are denoted by same reference numerals as those in Embodiment 1, and description thereof is omitted. In FIGS. 6A to 6E, an eccentricity and a tilt of the movable barrel 2 with respect to the fixed barrel 1 are omitted (i.e. not shown).

Figure 6A:
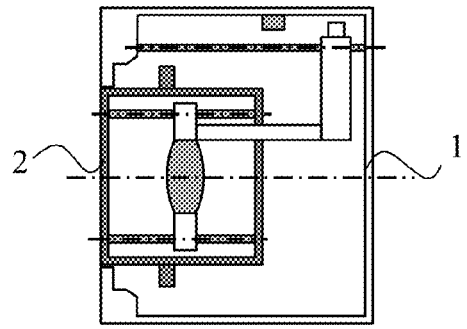
FIGS. 6A to 6E show protrusion and retraction operations of a lens barrel according to Embodiment 2 of the present invention.

FIG. 6A shows the retracted state in which almost the whole of the movable barrel 2 is housed in the fixed barrel 1. FIG. 6B shows a state immediately after the movable barrel 2 starts its movement in the +X direction from the retracted state. FIG. 6C shows a state after the lens frame 13 starts its movement in the +X direction and the detected portion 13d of the lens frame 13 proceeds toward the photo interrupter 21.

Figure 6D:
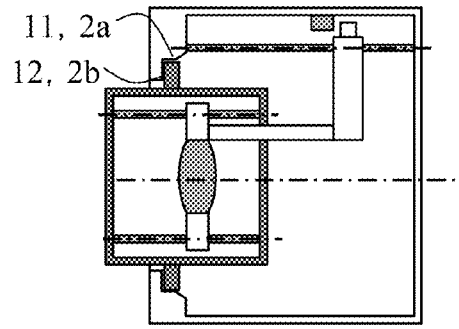
Figure 6B:
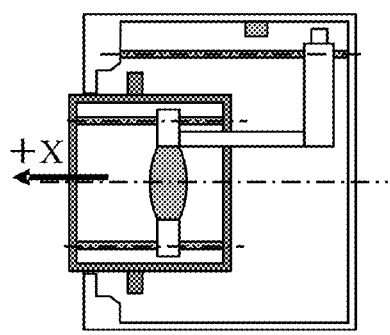

FIG. 6D shows an eccentricity/tilt adjustment completed state where the movable barrel 2 has been moved with respect to the fixed barrel 1 to a position where the eccentricity and tilt adjustment operations have completed. The reaching of the movable barrel 2 to this position can be detected by a detector (not shown).

Figure 6E:
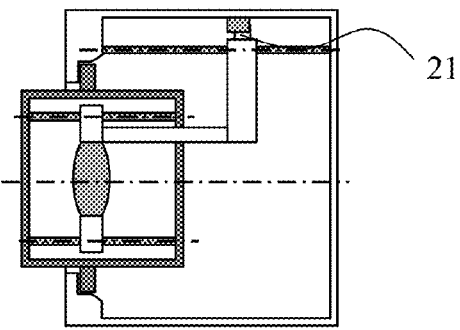
Figure 6C:
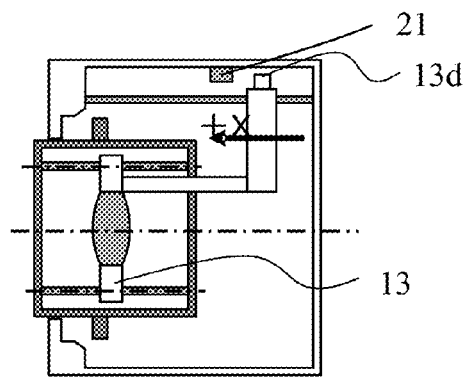

FIG. 6E shows a reset operation completed state where the detected portion 13d of the lens frame has entered inside the photo interrupter 21 and thereby the initial position detection of the lens frame 13 has completed. This state corresponds to the image capturing standby state. The movable barrel 2 and the lens frame 13 are respectively controlled in their movement speeds so as to reach their positions shown in FIG. 6E from their positions shown in FIG. 6D.

As described above, also in the lens barrel of this embodiment, as in Embodiment 1, the eccentricity and tilt adjustment operations of the movable barrel 2 with respect to the fixed barrel 1 and the reset operation of the lens frame 13 are performed from the retracted state, and the completion of them completes the transition to the image capturing standby state. Moreover, the reset operation of the lens frame is also started before the completion of the eccentricity and tilt adjustment operations of the movable barrel 2. However, different from Embodiment 1, the reset operation of the lens frame 13 is completed after the completion of the eccentricity and tilt adjustment operations of the movable barrel 2.

Figure 7:
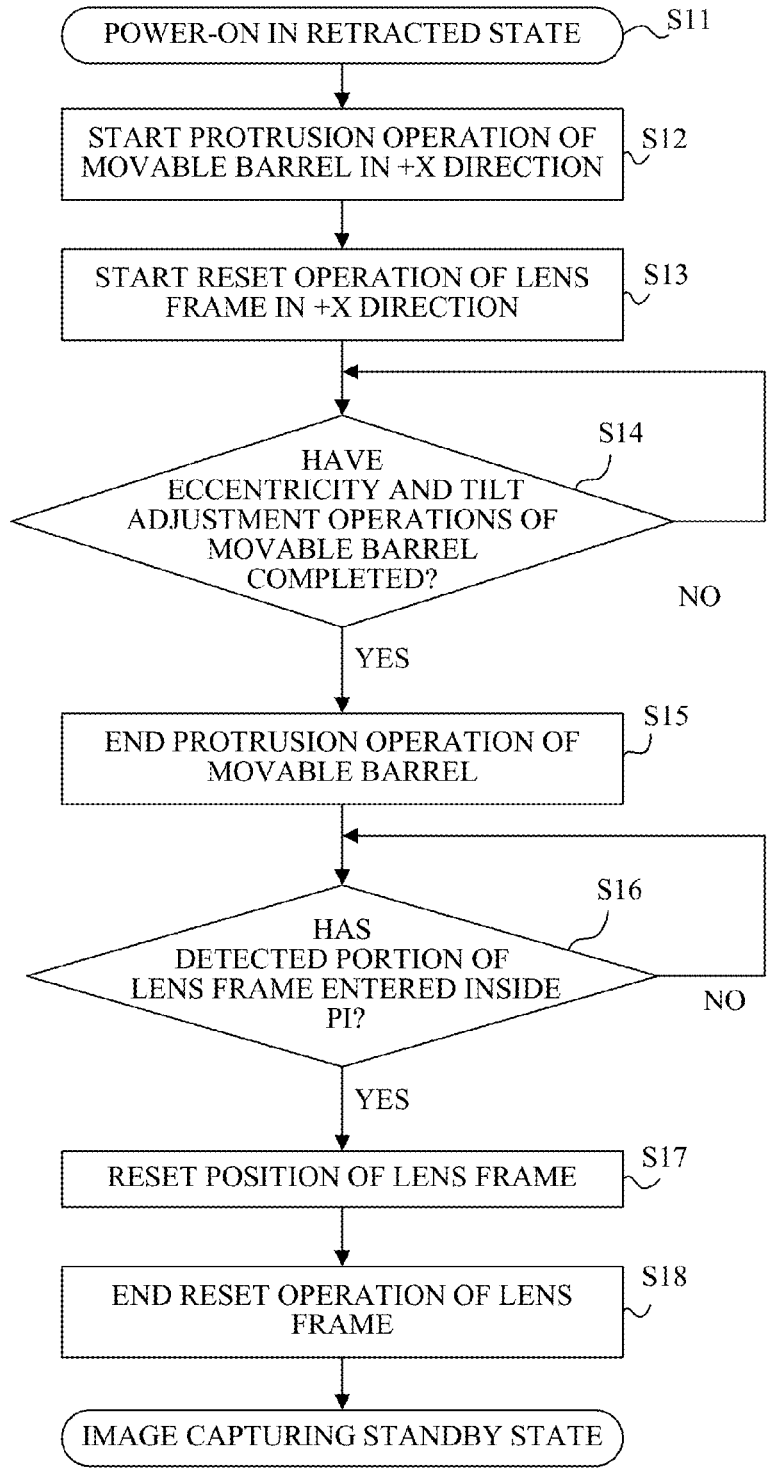
FIG. 7 is a flowchart showing control of the lens barrel of Embodiment 2.

FIG. 7 is a flowchart showing the operations of the lens barrel during the transition from the retracted state to the image capturing standby state. Also in this embodiment, the controller 32 controls the operations of the movable barrel driving mechanism and the lens driving mechanism according to a control program as a computer program.

In response to power-on of the image capturing apparatus at step S11, the controller 32 drives at step S12 the movable barrel driving mechanism to start the movement of the movable barrel 2 in the protrusion direction from the retracted state, as shown in FIG. 6B. Thereafter, the controller 32 drives at step S13 the lens driving mechanism to start the movement of the lens frame 13 in the reset direction, that is, the reset operation, as shown in FIG. 6C.

Next, at step S14, the controller 32 determines whether or not the eccentricity and tilt adjustment operations of the movable barrel 2 have completed. If the eccentricity and tilt adjustment operations have not yet completed, the controller 32 continues the movement of the movable barrel 2 in the protrusion direction through the movable barrel driving mechanism. On the other hand, if the eccentricity and tilt adjustment operations have completed, the controller 32 stops at step S15 the drive of the movable barrel driving mechanism to stop the movement of the movable barrel 2 in the protrusion direction, as shown in FIG. 6D.

Next, at step S16, the controller 32 determines whether or not the detected portion 13d of the lens frame 13 has entered inside the photo interrupter 21. If the detected portion 13d has not yet entered inside the photo interrupter 21 as shown in FIG. 6D, the controller 32 continues the movement of the lens frame 13 in the reset direction through the lens driving mechanism. On the other hand, if the detected portion 13d has entered inside the photo interrupter 21 as shown in FIG. 6E, the controller 32 resets at step S17 the position information of the lens frame 13 stored thereinside. Then, at step S18, the controller 32 stops the drive of the lens driving mechanism to end the reset operation of the lens frame 13. Thus, the transition to the image capturing standby state is completed.

As described above, also in this embodiment, the lens barrel starts the reset operation of the lens frame 13 as shown in FIG. 6C before the completion of the eccentricity and tilt adjustment operations of the movable barrel 2 which is shown in FIG. 6E. On the other hand, in this embodiment, the lens barrel performs the initial position detection of the lens frame 13 by the reset operation as shown in FIG. 6D after the completion of the eccentricity and tilt adjustment operations of the movable barrel 2. Even in this case, as compared with the case of starting the reset operation of the lens frame 13 after the completion of the eccentricity and tilt adjustment operations, it is possible to shorten a standby waiting time required for the transition from the retracted state to the image capturing standby state. As a result, image capturing can be started in a shorter time after the power-on of the image capturing apparatus.

In this embodiment, the initial position detection of the lens frame 13 is performed after the completion of the eccentricity and tilt adjustment operations. Therefore, even when the eccentricity amount or the tilt amount of the movable barrel 2 is somewhat large before the completion of the eccentricity and tilt adjustment operations, the initial position detection of the lens frame 13 can be performed with high accuracy.

Embodiment 3

Description will be made of operations of a lens barrel according to a third embodiment (Embodiment 3) of the present invention during transition from a retracted state to an image capturing standby state with reference to FIGS. 8A to 8E. The lens barrel of this embodiment has a same configuration as that of the lens barrel of Embodiment 1, so that components of the lens barrel of this embodiment identical to those in Embodiment 1 are denoted by same reference numerals as those in Embodiment 1, and description thereof is omitted. In FIGS. 8A to 8E, an eccentricity and a tilt of the movable barrel 2 with respect to the fixed barrel 1 are omitted (i.e. not shown).

Figure 8A:
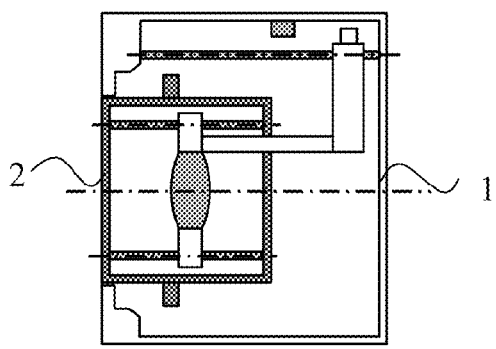
FIGS. 8A to 8E show protrusion and retraction operations of a lens barrel according to Embodiment 3 of the present invention.

FIG. 8A shows the retracted state in which almost the whole of the movable barrel 2 is housed in the fixed barrel 1. FIG. 8B shows a state immediately after the movable barrel 2 starts its movement in the +X direction from the retracted state. FIG. 8C shows a state where the outer cylindrical surface 2a of the movable barrel 2 reaches the slope portion 11a of the fixed barrel 1 and the eccentricity adjustment operation of the movable barrel 2 by the inner cylindrical surface 11 of the fixed barrel 1 is subsequently started. The reaching of the movable barrel 2 to this position can be detected by a detector (not shown).

Figure 8D:
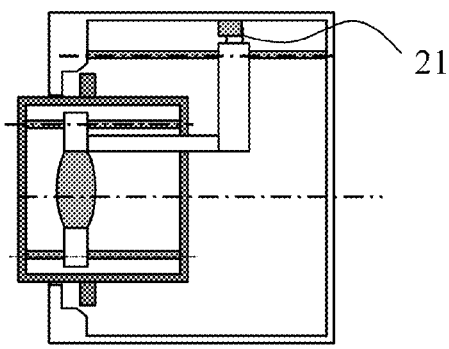
Figure 8B:
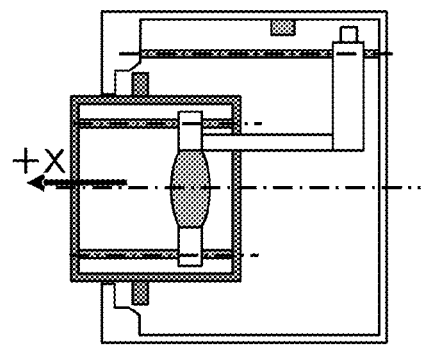

FIG. 8D shows a state after the lens frame 13 starts its movement in the +X direction and the detected portion 13d of the lens frame 13 has entered inside the photo interrupter 21. The movement of the lens frame 13 may be started at any timing.

Figure 8E:
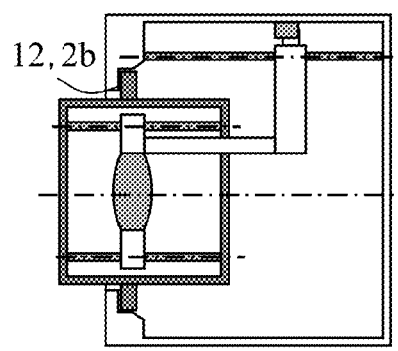
Figure 8C:
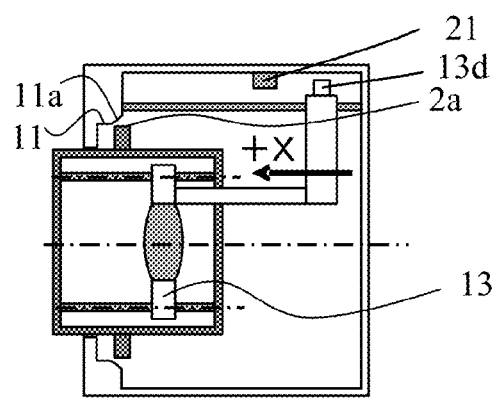

FIG. 8E shows an eccentricity/tilt adjustment completed state where the movable barrel 2 has been moved with respect to the fixed barrel 1 to a position where the eccentricity and tilt adjustment operations have completed. This state corresponds to the image capturing standby state. The reaching of the movable barrel 2 to this position can be detected by a detector (not shown). The movable barrel 2 and the lens frame 13 are respectively controlled in their movement speeds so as to reach their positions shown in FIG. 8E from their positions shown in FIG. 8D.

As described above, also in the lens barrel of this embodiment, the eccentricity and tilt adjustment operations of the movable barrel 2 with respect to the fixed barrel 1 and the reset operation of the lens frame 13 are performed from the retracted state, and the completion of them completes the transition to the image capturing standby state. Moreover, the reset operation of the lens frame 13 is also started before the completion of the eccentricity and tilt adjustment operations of the movable barrel 2. However, different from Embodiment 1, the reset operation of the lens frame 13 is started after the start of the eccentricity adjustment operation of the movable barrel 2.

Figure 9:
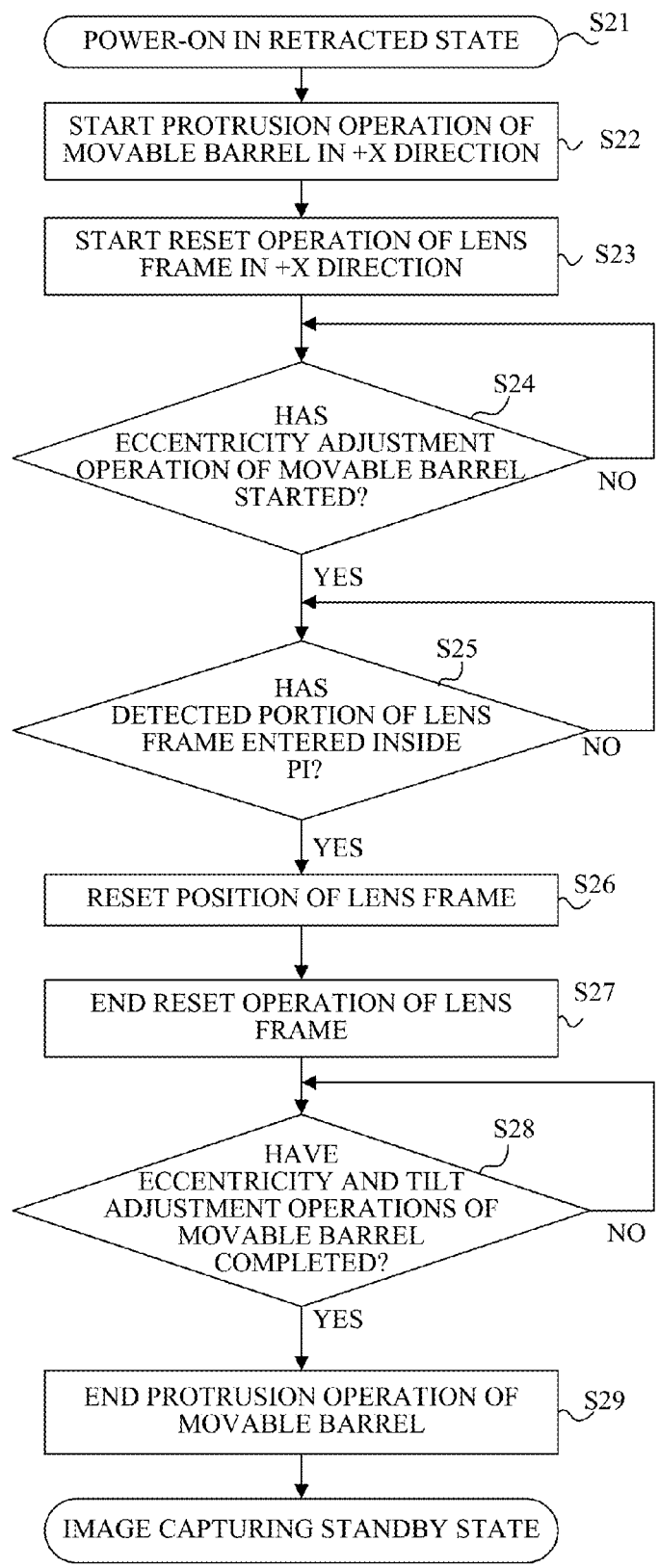
FIG. 9 is a flowchart showing control of the lens barrel of Embodiment 3.

FIG. 9 is a flowchart showing the operations of the lens barrel during the transition from the retracted state to the image capturing standby state. Also in this embodiment, the controller 32 controls the operations of the movable barrel driving mechanism and the lens driving mechanism according to a control program as a computer program.

In response to power-on of the image capturing apparatus at step S21, the controller 32 drives at step S22 the movable barrel driving mechanism to start the movement of the movable barrel 2 in the protrusion direction from the retracted state, as shown in FIG. 8B. Thereafter, the controller 32 drives at step S23 the lens driving mechanism to start the movement of the lens frame 13 in the reset direction, that is, the reset operation, as shown in FIG. 8C.

Next, at step S24, the controller 32 determines whether or not the eccentricity adjustment operation of the movable barrel 2 has started. If the eccentricity adjustment operation has not yet started, the controller 32 continues the movement of the movable barrel 2 in the protrusion direction through the movable barrel driving mechanism. On the other hand, if the eccentricity adjustment operation has started, the controller 32 determines at step S25 whether or not the detected portion 13d of the lens frame 13 has entered inside the photo interrupter 21.

If the detected portion 13d has not yet entered inside the photo interrupter 21 as shown in FIG. 8C, the controller 32 continues the movement of the lens frame 13 in the reset direction through the lens driving mechanism. On the other hand, if the detected portion 13d has entered inside the photo interrupter 21 as shown in FIG. 8D, the controller 32 resets at step S26 the position information of the lens frame 13 stored thereinside. Then, at step S27, the controller 32 stops the drive of the lens driving mechanism to end the reset operation of the lens frame 13.

Next, at step S28, the controller 32 determines whether or not the eccentricity and tilt adjustment operations of the movable barrel 2 have completed. If the eccentricity and tilt adjustment operations have not yet completed, the controller 32 continues the movement of the movable barrel 2 in the protrusion direction through the movable barrel driving mechanism. On the other hand, if the eccentricity and tilt adjustment operations have completed, the controller 32 stops at step S29 the drive of the movable barrel driving mechanism to stop the movement of the movable barrel 2 in the protrusion direction, as shown in FIG. 8E. Thus, the transition to the image capturing standby state is completed.

As described above, also in this embodiment, the lens barrel starts the reset operation of the lens frame 13 as shown in FIG. 8C before the completion of the eccentricity and tilt adjustment operations of the movable barrel 2 which is shown in FIG. 8E. On the other hand, in this embodiment, the lens barrel performs the initial position detection of the lens frame 13 by the reset operation as shown in FIG. 8D after the start of the eccentricity adjustment operation of the movable barrel 2 and before the completion of the eccentricity and tilt adjustment operations thereof. Even in this case, as compared with the case of starting the reset operation of the lens frame 13 after the completion of the eccentricity and tilt adjustment operations, it is possible to shorten a standby waiting time required for the transition from the retracted state to the image capturing standby state. As a result, image capturing can be started in a shorter time after the power-on of the image capturing apparatus.

Also in this embodiment, as in Embodiment 1, the reset operation (initial position detection) of the lens frame 13 is completed before the completion of the eccentricity and tilt adjustment operations. Therefore, it is desirable that amounts of the eccentricity and tilt of the movable barrel 2 before the completion of the eccentricity and tilt adjustment operations be as small as possible so that the eccentricity and tilt do not influence accuracy of the initial position detection of the lens frame 13.

Embodiment 4

Description will be made of operations of a lens barrel according to a fourth embodiment (Embodiment 4) of the present invention during transition from a retracted state to an image capturing standby state with reference to FIGS. 10A to 10E. The lens barrel of this embodiment has a same configuration as that of the lens barrel of Embodiment 1, so that components of the lens barrel in this embodiment identical to those in Embodiment 1 are denoted by same reference numerals as those in Embodiment 1, and description thereof is omitted. In FIGS. 10A to 10E, an eccentricity and a tilt of the movable barrel 2 with respect to the fixed barrel 1 are omitted (i.e. not shown).

Figure 10A:
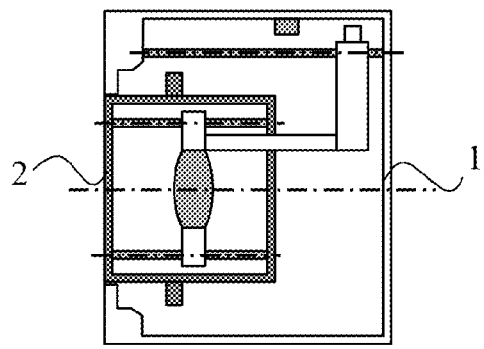
FIGS. 10A to 10E show protrusion and retraction operations of a lens barrel according to Embodiment 4 of the present invention.

FIG. 10A shows the retracted state in which almost the whole of the movable barrel 2 is housed in the fixed barrel 1. FIG. 10B shows a state where, after the movable barrel 2 starts its movement in the +X direction from the retracted state, the outer cylindrical surface 2a of the movable barrel 2 reaches the slope portion 11a of the fixed barrel 1 and the eccentricity adjustment operation of the movable barrel by the inner cylindrical surface 11 of the fixed barrel 1 is subsequently started.

Figure 10D:
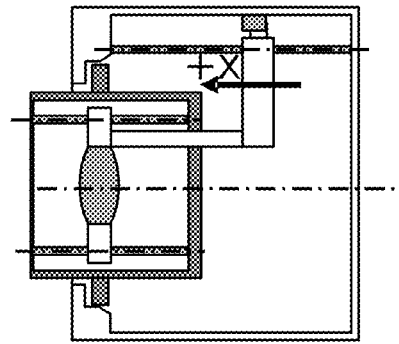
Figure 10B:
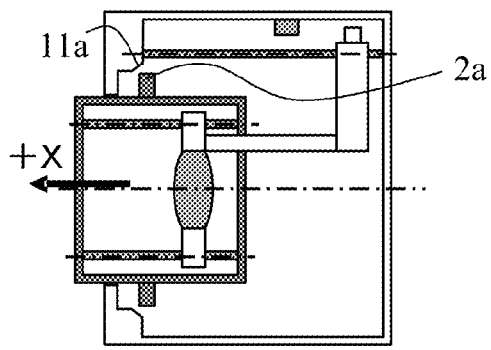
Figure 10E:
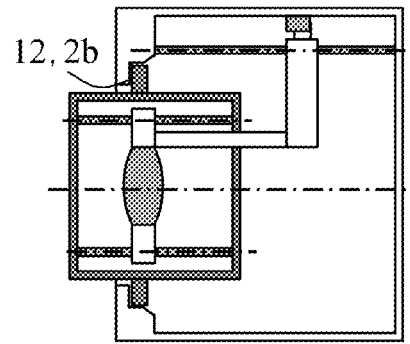
Figure 10C:
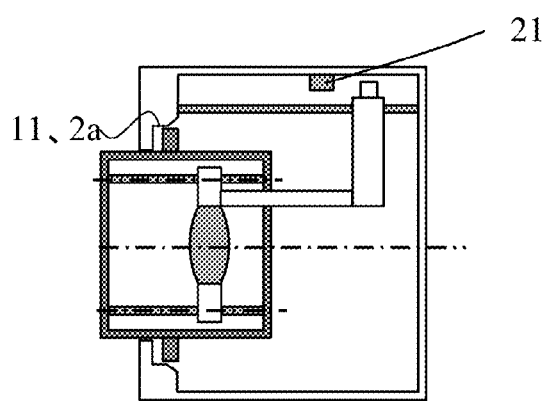

FIG. 10C shows a state where the eccentricity adjustment operation of the movable barrel 2 has completed. The movement of the lens frame 13 in the +X direction may be started at any timing; the movement of the lens frame 13 may already have started in this state or may be started after this state.

FIG. 10D shows a reset operation completed state where the detected portion 13d of the lens frame has entered inside the photo interrupter 21 and thereby the initial position detection of the lens frame 13 has completed. In this state, the circular ring surface 2a of the movable barrel 2 has not yet been in contact with the circular ring surface 12 of the fixed barrel 1, which means that the tilt adjustment operation of the movable barrel 2 has not yet completed. The movable barrel 2 and the lens frame 13 are respectively controlled in their movement speeds so as to reach their positions shown in FIG. 10D from their positions shown in FIG. 10C.

FIG. 10E shows an eccentricity/tilt adjustment completed state where the movable barrel 2 has been moved with respect to the fixed barrel 1 to a position where the eccentricity and tilt adjustment operations have completed. This state corresponds to the image capturing standby state. The reaching of the movable barrel 2 to this position can be detected by a detector (not shown).

As described above, also in the lens barrel of this embodiment, as in Embodiment 1, the eccentricity and tilt adjustment operations of the movable barrel 2 with respect to the fixed barrel 1 and the reset operation of the lens frame 13 are performed from the retracted state, and the completion of them completes the transition to the image capturing standby state. Moreover, the reset operation of the lens frame is also started before the completion of the eccentricity and tilt adjustment operations of the movable barrel 2. However, different from Embodiment 1, the reset operation of the lens frame 13 is started after the completion of the eccentricity adjustment operation of the movable barrel 2 and before the completion of the tilt adjustment operation thereof.

Figure 11:
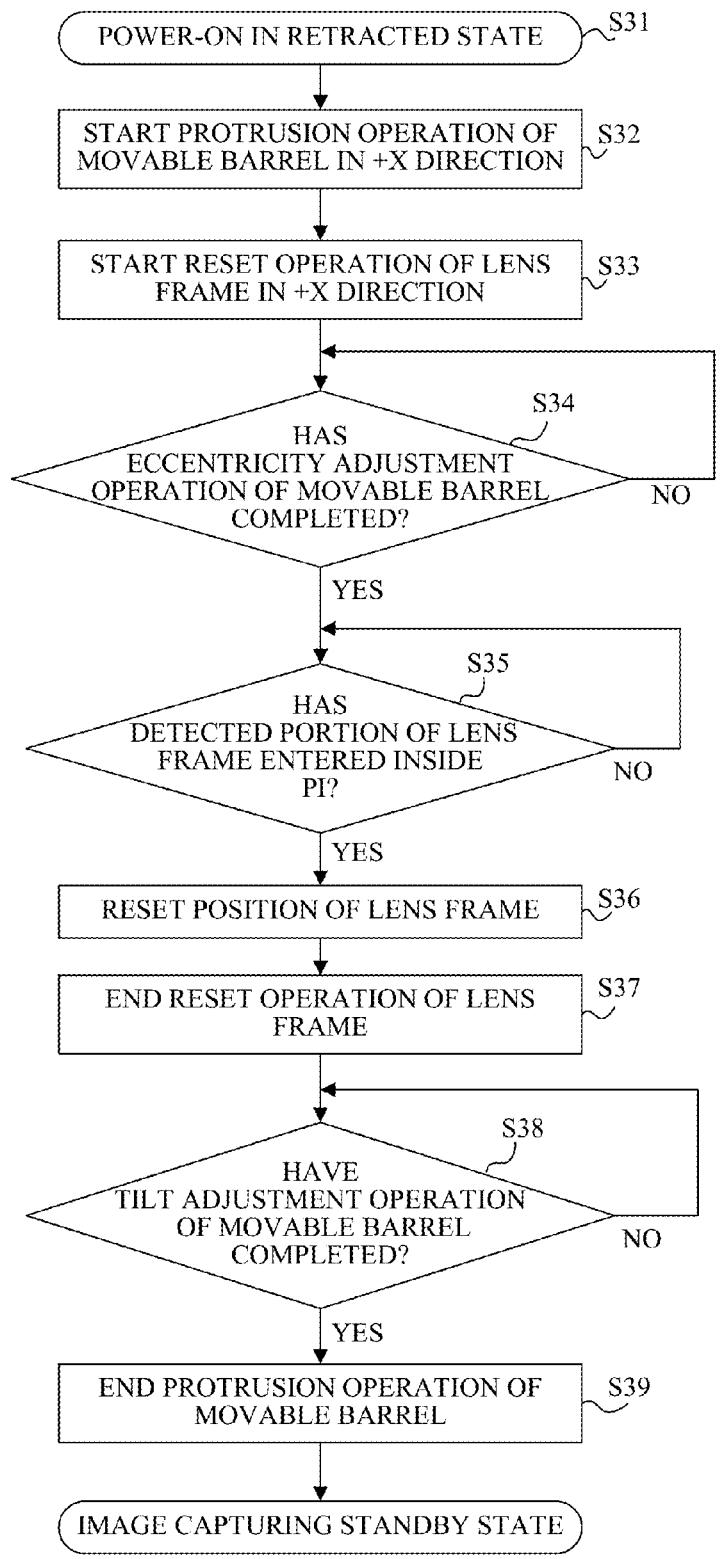
FIG. 11 is a flowchart showing control of the lens barrel of Embodiment 4.

FIG. 11 is a flowchart showing the operations of the lens barrel during the transition from the retracted state to the image capturing standby state. Also in this embodiment, the controller 32 controls the operations of the movable barrel driving mechanism and the lens driving mechanism according to a control program as a computer program.

In response to power-on of the image capturing apparatus at step S31, the controller 32 drives at step S32 the movable barrel driving mechanism to start the movement of the movable barrel 2 in the protrusion direction from the retracted state, as shown in FIG. 10B. Thereafter, the controller 32 drives at step S33 the lens driving mechanism to start the movement of the lens frame 13 in the reset direction, that is, the reset operation, as shown in FIG. 10C.

Next, at step S34, the controller 32 determines whether or not the eccentricity adjustment operation of the movable barrel 2 has completed. If the eccentricity adjustment operation has not yet completed, the controller 32 continues the movement of the movable barrel 2 in the protrusion direction through the movable barrel driving mechanism. On the other hand, if the eccentricity adjustment operation has completed, the controller 32 determines at step S35 whether or not the detected portion 13d of the lens frame 13 has entered inside the photo interrupter 21.

If the detected portion 13d has not yet entered inside the photo interrupter 21 as shown in FIG. 10C, the controller 32 continues the movement of the lens frame 13 in the reset direction through the lens driving mechanism. On the other hand, if the detected portion 13d has entered inside the photo interrupter 21 as shown in FIG. 10D, the controller 32 resets at step S36 the position information of the lens frame 13 stored thereinside. Then, at step S37, the controller 32 stops the drive of the lens driving mechanism to end the reset operation of the lens frame 13.

Next, at step S38, the controller 32 determines whether or not the tilt adjustment operation of the movable barrel 2 has completed. If the tilt adjustment operation has not yet completed, the controller 32 continues the movement of the movable barrel 2 in the protrusion direction through the movable barrel driving mechanism. On the other hand, if the tilt adjustment operation has completed, the controller 32 stops at step S39 the drive of the movable barrel driving mechanism to stop the movement of the movable barrel 2 in the protrusion direction, as shown in FIG. 10E. Thus, the transition to the image capturing standby state is completed.

As described above, also in this embodiment, the lens barrel starts the reset operation of the lens frame 13 as shown in FIG. 10C before the completion of the eccentricity and tilt adjustment operations of the movable barrel 2 which is shown in FIG. 10E. Moreover, in this embodiment, the lens barrel performs the initial position detection of the lens frame 13 by the reset operation as shown in FIG. 10D after the completion of the eccentricity adjustment operation of the movable barrel 2 and before the completion of the tilt adjustment operation thereof. Even in this case, as compared with the case of starting the reset operation of the lens frame 13 after the completion of the eccentricity and tilt adjustment operations, it is possible to shorten a standby waiting time required for the transition from the retracted state to the image capturing standby state. As a result, image capturing can be started in a shorter time after the power-on of the image capturing apparatus.

In this embodiment, the reset operation of the lens frame 13 is completed before the completion of the tilt adjustment operation of the movable barrel 2 but after the completion of the eccentricity adjustment operation thereof. This sequence makes it possible to improve accuracy of the initial position detection of the lens frame 13 as compared with Embodiment 3.

Embodiment 5

Description will be made of operations of a lens barrel according to a fifth embodiment (Embodiment 5) of the present invention during transition from a retracted state to an image capturing standby state with reference to FIGS. 12A to 12G. The lens barrel of this embodiment has a same configuration as that of the lens barrel of Embodiment 1, so that components of the lens barrel of this embodiment identical to those in Embodiment 1 are denoted by same reference numerals as those in Embodiment 1, and description thereof is omitted. In FIGS. 12A to 12G, an eccentricity and a tilt of the movable barrel 2 with respect to the fixed barrel 1 are omitted (i.e. not shown). This embodiment is a modified embodiment of Embodiment 2 in which the reset operation of the lens frame 13 is completed after the completion of the eccentricity and tilt adjustment operations of the movable barrel 2.

Figure 12A:
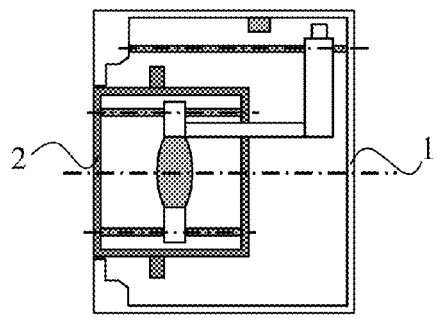
FIGS. 12A to 12G show protrusion and retraction operations of a lens barrel according to Embodiment 5 of the present invention.
Figure 12E:
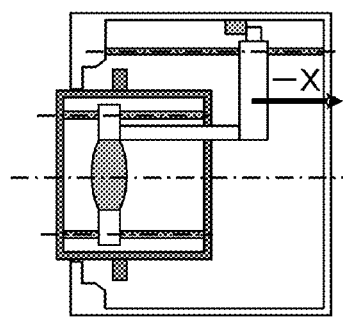
Figure 12B:
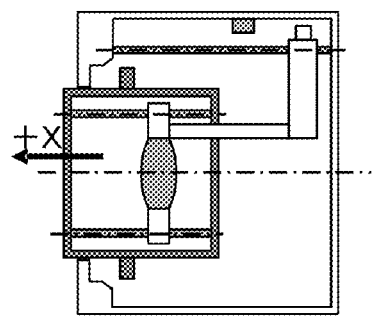

FIG. 12A shows the retracted state in which almost the whole of the movable barrel 2 is housed in the fixed barrel 1. FIG. 12B shows a state immediately after the movable barrel 2 starts its movement in the +X direction from the retracted state. FIG. 12C shows a state after the lens frame 13 starts its movement in the +X direction and the detected portion 13d of the lens frame 13 proceeds toward the photo interrupter 21.

Figure 12F:
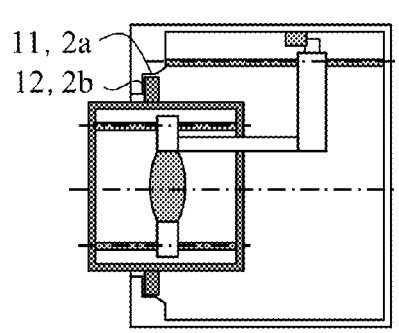
Figure 12C:
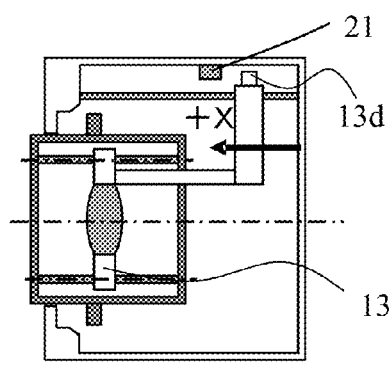
Figure 12G:
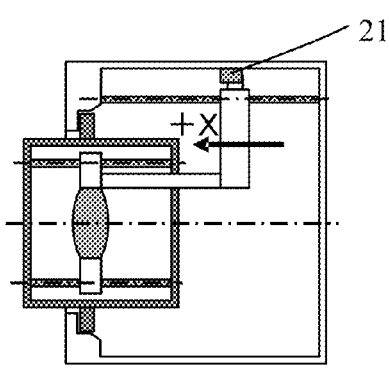
Figure 12D:
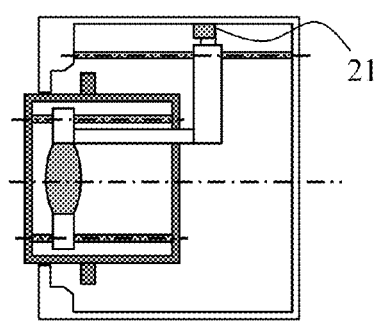

FIG. 12D shows a state where the detected portion 13d of the lens frame 13 has entered inside the photo interrupter 21 and the movement of the lens frame 13 has been stopped. FIG. 12E shows a state where the lens frame 13 has been moved to a waiting position away from the position shown in FIG. 12D in the −X direction by a predetermined movement amount and is waiting there. The initial position detection of the lens frame 13 shown in FIG. 12D is performed as a preliminary initial position detection prior to a main initial position detection to be subsequently performed. The control of the movement of the lens frame 13 shown from FIG. 12C to FIG. 12E corresponds to a first reference position detection control.

FIG. 12F shows an eccentricity/tilt adjustment completed state where the movable barrel 2 has been moved with respect to the fixed barrel 1 to a position where the eccentricity and tilt adjustment operations have completed. The reaching of the movable barrel 2 to this position can be detected by a detector (not shown). The movable barrel 2 and the lens frame 13 are respectively controlled in their movement speeds so as to reach their positions shown in FIG. 12F from their positions shown in FIG. 12E.

FIG. 12G shows a state where the lens frame 13 has been moved in the +X direction from the waiting position shown in FIG. 12E, the detected portion 13d of the lens frame 13 has entered again inside the photo interrupter 21 and thereby the main initial position detection of the lens frame 13 has been performed. This state shows that the reset operation has completed and corresponds to the image capturing standby state. The control of the movement of the lens frame 13 shown in FIG. 12G corresponds to a second initial position detection.

As described above, also in the lens barrel of this embodiment, the eccentricity and tilt adjustment operations of the movable barrel 2 with respect to the fixed barrel 1 and the reset operation of the lens frame 13 are performed from the retracted state, and the completion of them completes the transition to the image capturing standby state. Moreover, the reset operation of the lens frame 13 is also started before the completion of the eccentricity and tilt adjustment operations of the movable barrel 2. However, different from Embodiment 1, in the reset operation of the lens frame 13, an operation for the preliminary initial position detection (hereinafter referred to as "a preliminary initial position detection operation") is performed before the completion of the eccentricity and tilt adjustment operations of the movable barrel 2. Furthermore, in the reset operation of the lens frame 13, an operation for the main initial position detection (hereinafter referred to as "a main initial position detection operation") is performed after the completion of the eccentricity and tilt adjustment operations of the movable barrel 2.

Figure 13:
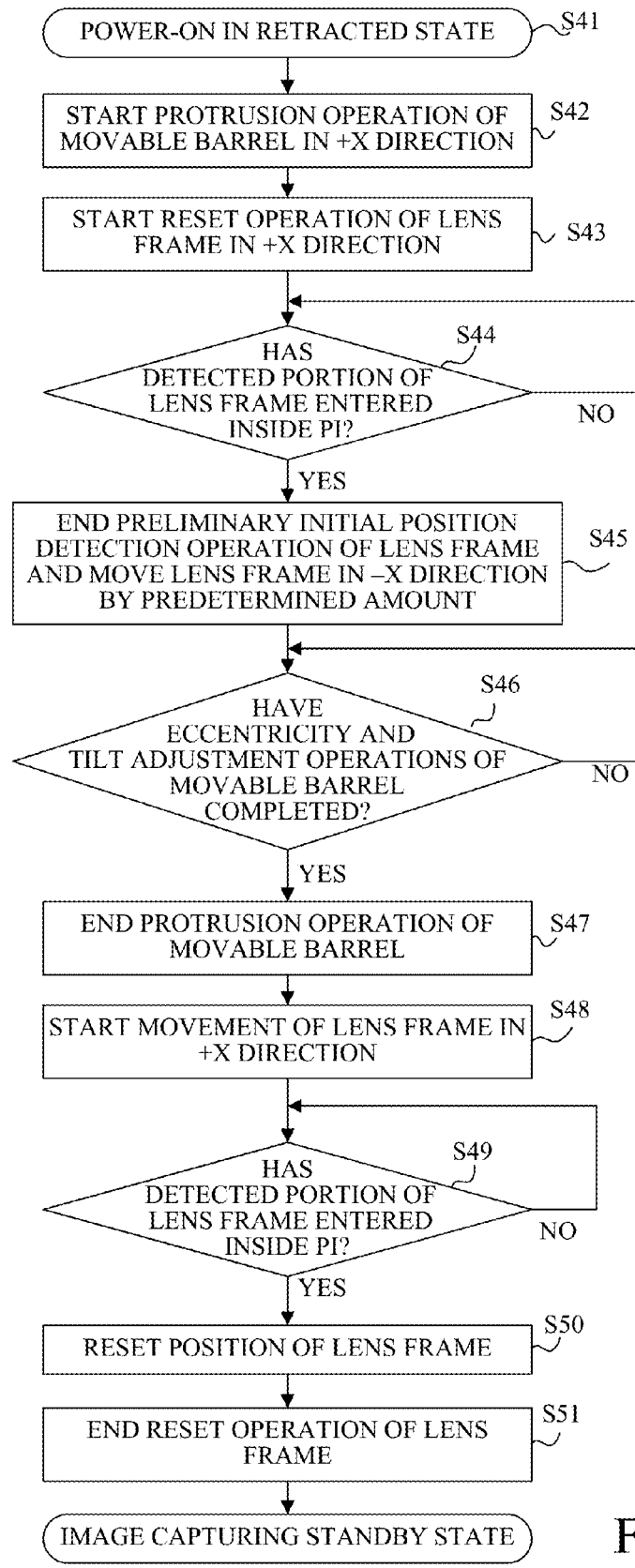
FIG. 13 is a flowchart showing control of the lens barrel of Embodiment 5.

FIG. 13 is a flowchart showing the operations of the lens barrel during the transition from the retracted state to the image capturing standby state. Also in this embodiment, the controller 32 controls the operations of the movable barrel driving mechanism and the lens driving mechanism according to a control program as a computer program.

In response to power-on of the image capturing apparatus at step S41, the controller 32 drives at step S42 the movable barrel driving mechanism to start the movement of the movable barrel 2 in the protrusion direction from the retracted state, as shown in FIG. 12B. Thereafter, the controller 32 starts at step S43 the first reference position detection control to drive the lens driving mechanism so as to move the lens frame 13 in the reset direction and thereby start the preliminary initial position detection operation in the reset operation of the lens frame 13, as shown in FIG. 12C.

Next, at Step S44, the controller 32 determines whether or not the detected portion 13d of the lens frame 13 has entered inside the photo interrupter 21. If the detected portion 13d has not yet entered inside the photo interrupter 21 as shown in FIG. 12C, the controller 32 continues the movement of the lens frame 13 in the reset direction through the lens driving mechanism. On the other hand, if the detected portion 13d has entered inside the photo interrupter 21 as shown in FIG. 12D, the controller 32 ends at step S45 the preliminary initial position detection operation of the lens frame 13. Then, at step S45, the controller 32 reversely drives the lens driving mechanism to move the lens frame 13 in the −X direction by the predetermined movement amount as shown in FIG. 12E and to stop the lens frame 13 at the waiting position.

Next, at step S46, the controller 32 determines whether or not the eccentricity and tilt adjustment operations of the movable barrel 2 have completed. If the eccentricity and tilt adjustment operations have not yet completed, the controller 32 continues the movement of the movable barrel 2 in the protrusion direction through the movable barrel driving mechanism. On the other hand, if the eccentricity and tilt adjustment operations have completed, the controller 32 stops at step S47 the drive of the movable barrel driving mechanism to stop the movement of the movable barrel 2 in the protrusion direction, as shown in FIG. 12F.

Next, at step S48, the controller 32 starts the second reference position detection control to drive the lens driving mechanism so as to move the lens frame 13 from the waiting position in the reset direction and thereby start the main initial position detection operation.

Next, at step S49, the controller 32 determines whether or not the detected portion 13d of the lens frame 13 has entered inside the photo interrupter 21. If the detected portion 13d has not yet entered inside the photo interrupter 21, the controller 32 continues the movement of the lens frame in the reset direction through the lens driving mechanism. On the other hand, if the detected portion 13d has entered inside the photo interrupter 21 as shown in FIG. 12G, the controller 32 resets at step S50 the position information of the lens frame 13 stored thereinside. Then, at step S51, the controller 32 stops the drive of the lens driving mechanism to end the reset operation of the lens frame 13. Thus, the transition to the image capturing standby state is completed.

As described above, in this embodiment, the lens barrel starts the reset operation of the lens frame 13 as shown in FIG. 12C before the completion of the eccentricity and tilt adjustment operations of the movable barrel 2 which is shown in FIG. 12F. Moreover, in this embodiment, the lens barrel performs the preliminary initial position detection operation of the lens frame 13, which is a part of the reset operation of the lens frame 13, as shown in FIG. 12D before the completion of the eccentricity and tilt adjustment operations of the movable barrel 2. Then, the lens barrel performs the main initial position detection operation of the lens frame 13, which is another part of the reset operation of the lens frame 13, as shown in FIG. 12G after the completion of the eccentricity and tilt adjustment operations of the movable barrel 2.

Even in this case, as compared with the case of starting the reset operation of the lens frame 13 after the completion of the eccentricity and tilt adjustment operations, it is possible to shorten a standby waiting time required for the transition from the retracted state to the image capturing standby state. As a result, image capturing can be started in a shorter time after the power-on of the image capturing apparatus.

In this embodiment, at the point of time of the completion of the eccentricity and tilt adjustment operations of the movable barrel 2 as shown in FIG. 12F, the lens frame 13 is waiting near the photo interrupter 21. This waiting of the lens frame 13 makes it possible, as compared with Embodiment 2, to reduce a time from the completion of the eccentricity and tilt adjustment operations of the movable barrel 2 to the completion of the reset operation (main initial position detection operation) of the lens frame 13. Therefore, this embodiment enables shortening the standby waiting time as compared with Embodiment 2.

The preliminary initial position detection operation of the lens frame 13 described in this embodiment may be added to Embodiments 1, 3 and 4.

Figure 14:
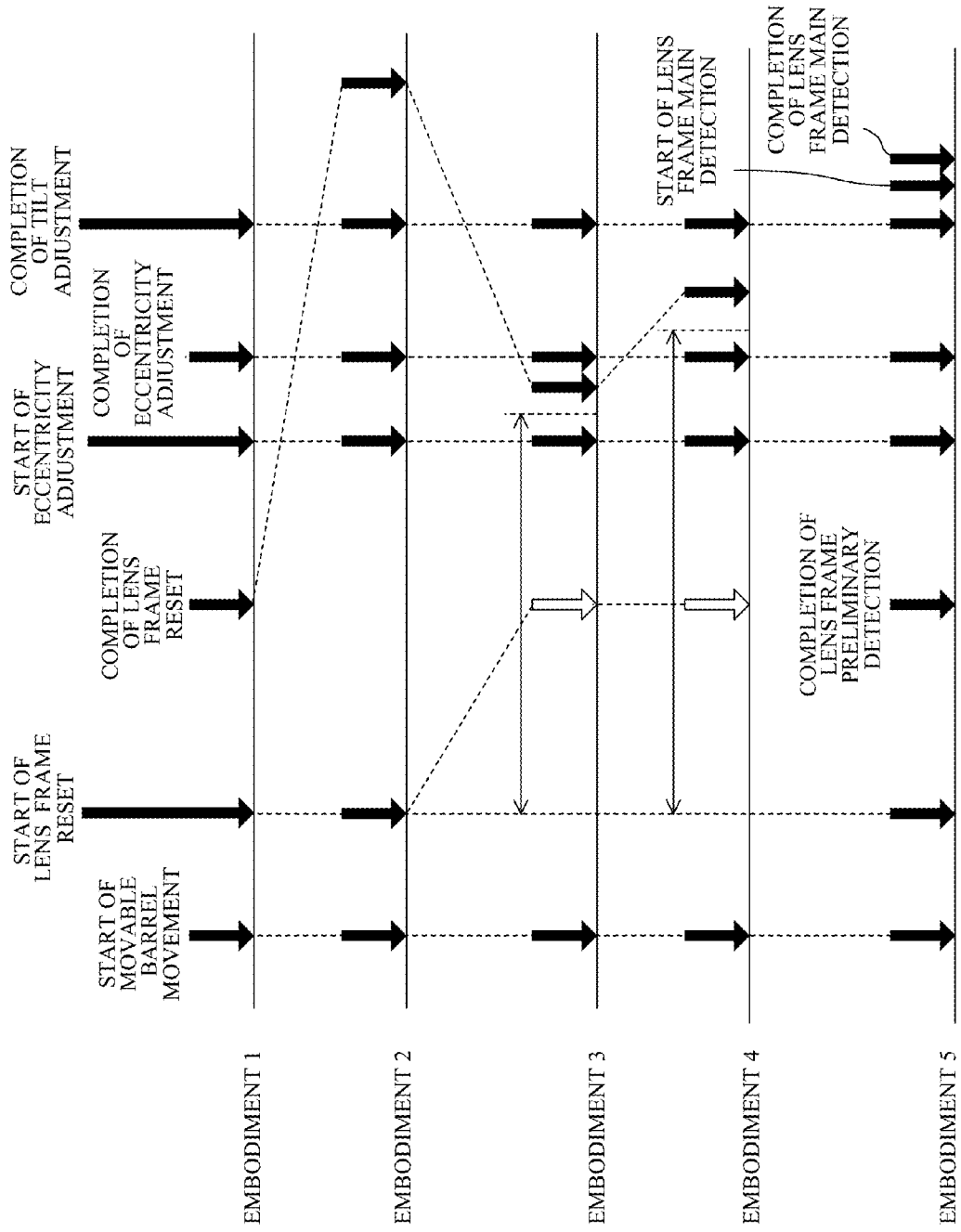
FIG. 14 is a timing chart collectively showing operation timings of the lens barrels of Embodiments 1 to 5.

FIG. 14 collectively shows timings of the operations from the retracted state to the image capturing standby state in the lens barrels of Embodiments 1 to 5, that is, of the start of the movement of the movable barrel 2, the start and completion of the eccentricity adjustment operation, the completion of the tilt adjustment operation and the start and completion of the reset operation of the lens frame 13. In FIG. 14, these timings are respectively abbreviated as, in the above order, "START OF MOVABLE BARREL MOVEMENT", "START/COMPLETION OF ECCENTRICITY ADJUSTMENT", "COMPLETION OF TILT ADJUSTMENT" and "START/COMPLETION OF LENS FRAME RESET".

FIG. 14 only shows an order of the start and completion timings of the above operations in each embodiment, and intervals between the timings have no meaning. In FIG. 14, broken lines connecting between bold arrows that show the timings in Embodiments 1 to 5 only represent which timing corresponds to each arrow, and do not mean that the timings shown by the arrows connected by the broken line are identical to one another.

Moreover, as for Embodiment 3 and 4, the start of the reset operation of the lens frame 13 shown by a white arrow may be selected at any timing within a range shown by a thin arrow. Furthermore, as for Embodiment 5, a timing of the completion of the preliminary initial position detection operation of the lens frame 13 and timings of the start and completion of the main initial position detection operation are respectively shown as "COMPLETION OF LENS FRAME PRELIMINARY DETECTION" and "START/COMPLETION OF LENS FRAME MAIN DETECTION".

Although each embodiment described the case of providing the translating eccentricity adjustment portion and the tilt eccentricity adjustment portion so that the eccentricity adjustment operation of the movable barrel 2 is performed prior to the tilt adjustment operation thereof, the eccentricity and tilt eccentricity adjustment portions may be provided so that the tilt adjustment operation is performed prior to the eccentricity adjustment operation or the eccentricity and tilt adjustment operations are performed simultaneously with each other. In these cases, when the movable barrel 2 is moved from the retracted position toward the protruded position, it is only necessary that the movement of the lens frame 13 is started toward the initial position before at least one of the completions of the eccentricity and tilt adjustment operations.

Furthermore, although Embodiment 3 described the case where the reset operation of the lens frame 13 is completed after the start of the eccentricity adjustment operation of the movable barrel 2 and before the completion thereof, the reset operation of the lens frame 13 may be completed after the start of the tilt adjustment operation and before the completion thereof. In other words, it is only necessary that the reset operation is completed after the start of at least one of the eccentricity and tilt adjustment operations and before the completion thereof.

In addition, although Embodiment 4 described the case where the reset operation of the lens frame 13 is completed after the completion of the eccentricity adjustment operation of the movable barrel 2 and before the completion of the tilt adjustment operation thereof, the reset operation of the lens frame 13 may be completed after the completion of the tilt adjustment operation and before the start or completion of the eccentricity adjustment operation. In other words, it is only necessary that the reset operation is completed after the completion of one of the eccentricity and tilt adjustment operations and before the start or completion of the other adjustment operation.

Each of the above-described embodiments enables shortening the standby waiting time while configuring the retractable lens barrel capable of performing the eccentricity and tilt adjustment operations of the movable barrel 2 and the detection of the initial (reference) position of the lens frame 13. Therefore, the lens barrel of each embodiment enables start of image capturing in a short time after power-on of the image capturing apparatus provided therewith.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-028086, filed on Feb. 18, 2014, which is hereby incorporated by reference wherein in its entirety.

What is claimed is:

1. A lens barrel comprising:
a base barrel;
a first guide portion held by the base barrel;
a movable barrel protrudable and retractable with respect to the base barrel in an optical axis direction;
a second guide portion held by the movable barrel such that when the movable barrel is protruded with respect to the base barrel during transition from a retracted state to an image capturing standby state, the second guide portion protrudes in an object side with respect to the first guide portion;
a lens holding member including a first held portion and a second held portion, the first held portion being held by the first guide portion so as to be movable in the optical axis direction, the second held portion being held by the second guide portion so as to be movable in the optical axis direction;
a lock portion for setting a positional relationship between the first and second guide portions during the transition from the retracted state to the image capturing standby state so that after the lock portion sets the positional relationship between the first and second guide portions, the lens holding member is movable in the optical direction in an image capturable state while maintaining the positional relationship between the first and second guide portions set by the lock portion;
an initial position detector for detecting an initial position of the lens holding member in the optical axis direction; and
a controller for controlling movements of the movable barrel and the lens holding member so that a movement of the lens holding member toward the initial position detector is started during the transition from the retracted state to the image capturing standby state before start of setting of the positional relationship by the lock portion.

2. A lens barrel according to claim 1, wherein the controller controls the movements of the movable barrel and the lens holding member so that: (a) detection of the initial position by the initial position detector is performed before completion of protrusion of the second guide portion, and (b) the detection of the initial position by the initial position detector is performed again after the completion of the protrusion of the second guide portion and before completion of the setting of the positional relationship by the lock portion.

3. A lens barrel according to claim 1, wherein the controller controls movements of the movable barrel and the lens holding member so that the movement of the lens holding member toward the initial position detector is started after completion of protrusion of the second guide portion.

4. An image capturing apparatus comprising:
a body; and
a lens barrel according to claim 1 fixed to the body; and
an image sensor.

5. The lens barrel according to claim 1, wherein the first held portion is directly held by the first guide portion so as to be movable in the optical axis direction, and the second held portion is directly held by the second guide portion so as to be movable in the optical axis direction.

6. The lens barrel according to claim 1, wherein the initial position of the lens holding member is a reference position in a movable range of the lens holding member and, when the initial position detector detects the initial position of the lens holding member, position information of the lens holding member is reset.

7. A lens barrel comprising:
a base barrel;
a first guide portion held by the base barrel;
a movable barrel protrudable and retractable with respect to the base barrel in an optical axis direction;
a second guide portion held by the movable barrel such that when the movable barrel is protruded with respect to the base barrel during transition from a retracted state to an image capturing standby state, the second guide portion protrudes in an object side with respect to the first guide portion;

a lens holding member including a first held portion and a second held portion, the first held portion being held by the first guide portion so as to be movable in the optical axis direction, and the second held portion being held by the second guide portion so as to be movable in the optical axis direction;

a lock portion for setting a positional relationship between the first and second guide portions during the transition from the retracted state to the image capturing standby state so that after the lock portion sets the positional relationship between the first and second guide portions, the lens holding member is movable in the optical direction in an image capturable state while maintaining the positional relationship between the first and second guide portions set by the lock portion;

an initial position detector for detecting an initial position of the lens holding member in the optical axis direction; and a controller for controlling movements of the movable barrel and the lens holding member so that detection of the initial position by the initial position detector is performed during the transition from the retracted state and the image capturing standby state after completion of protrusion of the second guide portion and before completion of setting of the positional relationship by the lock portion.

8. A lens barrel according to claim 7, further comprising:

a translational eccentricity adjustment portion to adjust a translational eccentricity between the first and second guide portions in a direction orthogonal to the optical axis direction; and a tilt eccentricity adjustment portion to adjust a tilt eccentricity of the second guide portion with respect to the first guide portion.

9. A lens barrel according to claim 8, wherein the controller controls the movements of the movable barrel and the lens holding member so that the detection of the initial position by the initial position detector is performed after completion of adjustment of the translational eccentricity by the translational eccentricity adjustment portion.

10. A lens barrel according to claim 8, wherein the controller controls the movements of the movable barrel and the lens holding member so that the detection of the initial position by the initial position detector is performed after completion of adjustment of the translational and tilt eccentricities by the translational and tilt eccentricity adjustment portions.

11. An image capturing apparatus comprising:

a body; and a lens barrel according to claim 7 fixed to the body; and an image sensor.

12. The lens barrel according to claim 7, wherein the first held portion is directly held by the first guide portion so as to be movable in the optical axis direction, and the second held portion is directly held by the second guide portion so as to be movable in the optical axis direction.

13. The lens barrel according to claim 7, wherein the initial position of the lens holding member is a reference position in a movable range of the lens holding member and, when the initial position detector detects the initial position of the lens holding member, position information of the lens holding member is reset.

\* \* \* \* \*